United States Patent Office 3,244,658
Patented Apr. 5, 1966

3,244,658
PROCESS OF PREPARING A STABLE AQUEOUS EMULSION
Frederick Grosser, Midland Park, and Marvin R. Leibowitz, Edison, N.J., assignors to General Aniline & Film Corporation, New York, N.Y., a corporation of Delaware
No Drawing. Filed Nov. 16, 1960, Ser. No. 69,572
5 Claims. (Cl. 260—29.6)

This invention relates to the production of a stable synthetic aqueous emulsion and more particularly to a stable aqueous emulsion containing a polymeric N-vinyl lactam and a process for producing such emulsion.

It is well known in the art that N-vinyl lactams can be interpolymerized with other polymerizable monomers such as acrylic and methacrylic acids and their esters, vinyl esters, and the like. Such interpolymerization has been carried out in non-aqueous systems which are not well adapted for the production of aqueous emulsions. When such interpolymerizations have been carried out in aqueous systems, either water soluble copolymers, interpolymers or mixtures of polymers have been obtained yielding aqueous solutions, or unstable emulsions have been obtained which separate upon standing and/or yield very cloudy films. These cloudy films are normally considered to indicate incompatibility or instability and show that a true interpolymer has not been produced but more likely a mixture of homopolymers. Nor has the concurrent use of a variety of catalysts, emulsifying agents, protective colloids, buffering agents, etc., resolved the problem.

A major use for acrylic and other polymers is in the form of an aqueous emulsion as employed in the paint, coatings, adhesives, polishes, and textile sizing fields. Aqueous emulsions have a great many advantages over other systems such as organic solvent systems, including the absence of fire hazards and odor and the like, low toxicity, low cost, etc. Ordinarily, emulsion polymerization is the preferred method for the preparation of such aqueous emulsions because of the economy and safety or water as the polymerization medium, the ease of temperature control, the speed of reaction, and the fact that the desired product in emulsion form is directly produced. However, as pointed out above, the use of such emulsion polymerization method or any other method for making stable aqueous emulsions having a basis of a polymeric N-vinyl lactam has hitherto been unsuccessful.

It is an object of this invention to provide a method for producing a stable aqueous emulsion containing a polymeric N-vinyl lactam. Another object of this invention is the provision of a stable aqueous emulsion containing a polymeric N-vinyl lactam. Still another object of this invention is the provision of novel graft copolymers containing a polymeric N-vinyl lactam. Other objects and advantages will appear as the description proceeds.

The attainment of the above objects is made possible by the process of this invention which comprises subjecting a mixture of an acrylic ester monomer in an aqueous solution of a polymeric N-vinyl lactam to polymerization conditions in the presence of a free radical-supplying polymerization catalyst. The process of this invention enables the provision of aqueous emulsions having surprisingly improved properties with respect to stability, low viscosity, film clarity, and the like. Extractions, solubility and film clarity tests indicate that in these emulsions, the polymeric product is in a high degree of interpolymerization or copolymerization and contains a minimum amount of homopolymer. The resulting emulsions can be compounded with a wide variety of additives such as pigments, salts, protective colloids, wetting agents, plasticizers, resins, waxes and the like to obtain a wide range of products for use in all fields in which polymeric emulsions are now used such as in the paint, coatings, adhesives, polishes and textile fields.

N-vinyl lactams and water soluble polymers thereof, and methods for their production are well known in the art. Thus, for example U.S. 2,317,804 discloses a suitable method for preparing N-vinyl lactams and U.S. 2,265,450 and 2,335,454 disclose methods for preparing water soluble polymers thereof and aqueous solutions containing the same. As examples of N-vinyl lactams which may be employed in producing in known manner the operative aqueous solutions of water soluble polymers thereof, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone (otherwise referred to as 1-vinyl-2-pyrrolidone, N-vinyl-α-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl - 3,3-dimethyl - 2 - pyrrolidone, and the like. Other N-vinyl lactams which may be employed include N-vinyl-hexahydrophthalimidine, N-vinyl-naphthostyrile, etc. Depending upon the extent of polymerization, these polymeric N-vinyl lactams may have molecular weights ranging from at least 400 up to 2,000,000 or more. The Fickentscher K value is a convenient designation of relative degree of polymerization or relative molecular weight. Generally, there may be employed those polymeric N-vinyl lactams having a K value of about 10 to 200 and preferably about 20 to 60, and mixtures thereof.

The acrylic ester monomer (or mixtures thereof) employed herein may be any ester of acrylic, methacrylic, α-ethacrylic, or α-chloracrylic acid with a monohydroxylic organic compound referred to herein as a monohydric alcohol, which may be saturated or unsaturated, aromatic or aliphatic, straight or branched chain, substituted or unsubstituted. As examples of suitable monohydroxylic organic compounds which may be employed for esterifying one of the above mentioned acrylic acids, there may be mentioned such alcohols such as methyl, ethyl, propyl, butyl, isobutyl, 2-ethyl hexyl, amyl, hexyl, cyclohexyl, heptyl, dodecyl, octyl, oxo tridecyl, tetradecyl, pentadecyl, hexadecyl, octadecyl, oleyl, arachidyl, ceryl, dimethylaminoethyl, tertiary-butylaminoethyl, and benzyl alcohol in addition to phenol, naphthol and the like. These esters are substantially water insoluble.

The free radical-supplying polymerization catalysts useful in the present process are well known in the art. Most of the catalysts are compounds yielding oxygen under the conditions of polymerization, as represented by the inorganic and organic peroxygen or peroxide compounds. As examples of such compounds, there may be mentioned hydrogen peroxide, metal and alkali metal peroxides such as sodium, potassium, barium and zinc peroxide, diacyl peroxides such as diacetyl, dibenzoyl and dilauroyl peroxide, dialkyl peroxides such as di-(tertiary-butyl) peroxide and di-(tertiary-butyl) hydroperoxide, cyclohexene peroxide, inorganic peroxygen acids such as perboric, persulfuric and peracetic acid and their ammonium, sodium and potassium salts, in addition to redox systems such as potassium or ammonium persulfate-sodium bisulfite. Other oxygen-yielding compounds or sources include atmospheric oxygen, ozone and the like.

Azo type catalysts, i.e. compounds containing the azo linkage, may also be employed. As example of such catalysts there may be mentioned α,α'-azobis-(α,γ-dimethyl-valeronitrile), α,α'-azobis-(α-methyl butyronitrile), α,α'-azobis-(α-ethyl butyronitrile), α,α'-azo-diisobutyramide, dimethyl and diethyl α,α'-azodiisobutyrate, and the like.

The preferred catalysts effective for the production of optimum results with respect to a minimum of homopolymer and maximum emulsion stability and film clarity are those which are water soluble, preferably the inorganic peroxygen compounds referred to above.

In carrying out the polymerization reaction, the catalyst and acrylic ester monomer may be admixed with the aqueous solution of polymeric N-vinyl lactam in any order, in increments or otherwise. For better temperature control and production of a product with optimum properties, it is, however, preferred to add the monomer gradually and/or in increments to the aqueous solution of polymeric N-vinyl lactam containing the catalyst. The reaction is exothermic in nature and is conveniently carried out at reflux or the boiling point of the mixture. However, the polymerization reaction may be carried out at any temperature ranging from room temperature up to the boiling point, depending upon the particular catalyst employed and the particular monomer and polymeric N-vinyl lactam. It is preferred to carry out this reaction at a temperature ranging from about 70° C. up to the boiling point of the mixture to accelerate completion thereof. The pH of the medium is substantially noncritical, though a pH of about 2 to 7 or 8 is preferred. Completion of the reaction is determined by cessation of evolution of heat and/or spot analysis for solids content and the like.

The polymerization reaction is subtantially quantitative in that an emulsion is produced containing the polymeric N-vinyl lactam-acrylic ester copolymer in the dispersed phase with little or no polymeric product dissolved in the continuous aqueous phase. The weight ratio of polymeric N-vinyl lactam to acrylic ester monomer ranges from about 5:95 to 60:40. The catalyst may be employed in amounts of about 0.05 to 2 or 3% by weight based on the weight of the acrylic ester monomer or mixture of monomers employed in the reaction. Desirably, the polymerization reaction should be carried out in a manner effective for yielding an aqueus emulsion containing about 10 to 60% of the graft copolymer product.

The emulsions produced in accordance with this invention are characterized by unusually good stability, low to medium viscosities generally below about 2500 cps. (centipoises, Brookfield viscometer), the ability to deposit a clear transparent film on a glass plate, and a copolymer product which is essentially water insoluble and at least about 90% soluble in benzene. The product may be characterized as a graft copolymer of an acrylic ester on a polymeric N-vinyl lactam substrate. In contrast, copolymeriztion of an N-vinyl lactam monomer and acrylic ester monomer in about equal amounts yields an unstable emulsion which has a relatively high viscosity of up to 75,000 cps. or more, which yields an opaque fillm on a glass plate and in which the polymeric product is 50% soluble in benzene, apparently indicating the production of a water soluble N-vinyl lactam homopolymer and a benzene soluble acrylic ester homopolymer.

It will be undestood that in carrying out the process of this invention, the known surface active agents, protective colloids, plasticizers, thickeners, and other additives may be added prior to, during or after the polymerization reaction is completed. Anionic, nonionic or cationic emulsifying agents may be employed although anionic and nonionic agents are preferred. As examples of nonionic agents which may be employed, there may be mentioned the condensation products of a plurality of moles of ethylene oxide with organic compounds containing at least 8 carbon atoms and a reactive hydrogen atom such as the water insoluble carboxylic and sulfonic acids, alcohols, thiols, phenols, hydroxy carboxylic acids, carboxy and sulfonic acid amides, primary and secondary amines, hydroxyalkylamines, as disclosed for example in U.S. Patents 1,970,578; 2,205,021; 2,085,706; 2,002,613; 2,226,141; 2,677,700; 2,213,477; 2,593,112; 2,454,434; 2,454,542,-545, and 2,174,761. As specific examples of such nonionic agents there may be mentioned the reaction products of 1 mole of nonylphenol with 9 to 100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O. 1 mole of soybean oil amine with 10 E.O., 1 mole of rosin amine with 32 E.O., 1 mole of cocoanut fatty acid amine with 7 O.E., 1 mole of dinonyl phenol with 15 E.O., 1 mole of oxo tridecyl alcohol with 12 E.O., Pluronic L62 and the like.

Suitable anionic surface active agents include the sulfonic acids, sudfate esters, and phosphate esters (particularly the primary and secondary phosphate esters and mixtures thereof) of the above mentioned nonionic surface active agents. Other such anionic surface active agents include alkylaryl sulfonic acids such as dodecylbenzene sulfonic acid, alkyl sulfates such as sodium lauryl sulfate, taurides such as sodium N-methyl tauride, isethionates such as sodium N-methyl isethionate and the like.

Protective colloids and/or thickening agents may also be employed if desired such as polyvinyl alcohol, copolymers such as the copolymer of vinyl methyl ether and maleic anhydride, hydroxyethyl cellulose, carboxymethyl cellulose, natural gums and colloidal materials and the like. Viscosities of up to 20,000 cps. or more may thereby be obtained when required.

As a further feature of this invention, it has been found that the graft copolymers produced herein have sufficiently higher softening points as compared with the acrylic ester polymers per se to permit separation by a spray drying technique. The aqueous emulsion produced herein may accordingly be subjected to a spray drying treatment to yield a fine fre flowing grapft polymer powder suitable for use in molding compositions, coatings, adhesives, films, fibers and other solid articles, and for redispersion in aqueous media to yield stable emulsions.

The following examples are illustrative of this invention and are not to be regarded as imitative. All parts and proportions referred to herein are by weight unless otherwise indicated.

EXAMLE 1

*(For comparison)*

To a 4-neck, 1-liter flask fitted with stirrer, thermometer, $N_2$ bleed and condenser was charged 100 grams N-vinyl-2-pyrrolidone
    100 grams methyl methacrylate
    20 grams Triton X-200 (sodium isooctyl phenoxyethoxyethylsulfonate)
    300 grams distilled water
    2 grams sodium bicarbonate
    0.3 grams ammonium persulfate Following is a log of the reaction:

| Time | Temp., °C. | Comments |
| --- | --- | --- |
| 1:38 | 28 | Agitation and $N_2$ bleed started and heat put on. |
| 1:54 | 63 | Pinkish purple color. pH>7. |
| 1:58 | 74 | Reflux. |
| 2:03 | 86 | Light purple tan color. |
| 2:30 | 88 | Added 0.15 grams ammonium persulfate. |
| 3:20 | 89 | Material kicked out. |

When azoiso butyronitrile was substituted for the ammonium persulfate, material separated into 2 phases after a short while. When 1.5 grams of hydroxyethyl cellulose was used as a protective colloid, material separated into 2 phases at end of polymerization.

EXAMPLE 2

*(For comparison)*

To a 2-neck, 1-liter flask fitted with stirrer, thermometer, $N_2$ bleed and condenser was charged

- 350 grams distilled water
- 120 grams N-vinyl-2-pyrrolidone
- 10 grams Triton X–200
- 1 ml. $NH_4OH$ (28%)

Agitation and $N_2$ purge was started and the material was heated to 60° C. There was then charged

- 1 ml. hydrogen peroxide (35%) and
- 90 grams ethyl acrylate continuously over a 30 minute period Following is a log of the reaction:

| Time | Temp., °C. | Comments |
|---|---|---|
| 11:24 | 60 | Added 1 ml. hydrogen peroxide (35%). |
| 11:25 | 60 | Started addition of ethyl acrylate. |
| 11:28 | 80 | Kicking, cooling with ice water. |
| 11:40 | 65 | Heat off. |
| 12:10 | 64 | All ethyl acrylate in, starting to thicken. |
| 1:20 | 50 | Stirring difficult. |
| 1:53 | 90 | Add 100 ml. $H_2O$. |
| 1:58 | 90 | Agitation paddle broke. |
| 2:16 | 66 | Replaced agitator and heated to 100° C. |
| 2:52 | 100 | Starting to cool. |

The material was very thick when discharged and the viscosity was over 75,000 cps. as measured on a Brookfield viscosimeter. Percent solids=35.6.

A thin film (.0015 in.) was spread on a glass plate with some of this material and allowed to dry overnight at room temperature. The next day it dried to a very opaque film.

Several days later the material started to separate into 2 phases, an upper watery layer and a bottom phase so viscous that it had no flow.

EXAMPLE 3

To the same equipment as used in the previous experiments was added

- 350 grams distilled water
- 120 grams poly-N-vinyl-2-pyrrolidone * (PVP) K–30
- 10 grams Triton X–200
- 35 grams ethyl acrylate
- 6 ml. 5% ammonium persulfate

*Prepared by polymerization with hydrogen peroxide and $NH_4OH$ as catalyst in aqueous solution and then spray dried.

Agitation was turned on and $N_2$ purge started. Following is a log of reaction:

| Time | Temp., °C. | Comments |
|---|---|---|
| 9:39 | 24 | Heating to reflux. |
| 10:04 | 91 | Refluxing, adding 90 gms. ethyl acrylate continuously over a 1 hour period. |
| 11:04 | 90 | All ethyl acrylate in, maintaining reflux until 100° C. |
| 2:00 | 100 | Cooling down, added 0.3 ml., $NH_4OH$ and discharged. |

Material was a fluid, stable emulsion, percent solids=37.5. Brookfield viscosity was approximately 1000 cps.

A thin film (.0015 in.) was spread on a glass plate and allowed to dry overnight at room temperature. The next day it dried to a clear, transparent film.

After several weeks aging, the material remained a very fluid, stable emulsion with no separation.

EXAMPLE 4

To the same equipment as used in the previous experiments was added

- 350 grams distilled water
- 100 grams PVP (K–30)
- 5 ml. 5% ammonium persulfate
- 2.5 mls. 10% sodium bisulfite anhydrous Following is a log of the reaction:

| Time | Temp., °C. | Comments |
|---|---|---|
| 12:58 | | All materials charged. 100 gms. MMA (methyl methacrylate monomer) charged to dropping funnel. |
| 1:08 | 30 | Agitation, $N_2$ purge on. Begin monomer addition. |
| 1:19 | 29 | 35 gms. MMA in. Began heating. Feed off. |
| 1:40 | 80 | Drop mantle. |
| 1:43 | 81 | Begin adding remainder of MMA. |
| 2:00 | | All monomer in. |
| 2:32 | | Shut down. pH adjusted to 6.4 with $NH_4OH$. |

The material was a smooth milk-like emulsion with blue fringe. Percent N on dry sample=6.01% (47.5% VP). One year later, material was still a stable emulsion with no signs of separation or layering. Film on glass plate was clear and transparent.

EXAMPLE 5

A mixture of 1.00 gm. PVP K–30 and 1.00 gm. polymethylmethacrylate was thoroughly blended. The mixture was repeatedly extracted with benzene and both the benzene soluble and insoluble portions were dried under vacuum overnight at 250° C. The following weights and N analysis were obtained:

| | Percent N | Percent PVP | Wt. PVP |
|---|---|---|---|
| Benzene soluble, 0.80 gm | 0.54 | 4.3 | 0.035 |
| Benzene insoluble, 1.50 gm. (contains occluded benzene) | 8.49 | 67.5 | 1.01 |

The above data show that benzene extracts only polymethylmethacrylate and no PVP, since all the PVP was recovered in the insoluble phase. This is consistent with previous knowledge.

Another mixture of 2.00 grams of the interpolymer prepared in Example 4 was extracted repeatedly with benzene as above and both soluble and insoluble portions were dried, weighed and N analysis run:

| | Percent N | Percent PVP | Wt. PVP |
|---|---|---|---|
| Benzene soluble, 1.80 gms | 5.02 | 39.9 | 0.72 |
| Benzene insoluble, 0.17 gm | 9.53 | 75.5 | 0.13 |

The above data shows that Example 4 produced an interpolymer and not a blend or simple mixture of homopolymers, since the interpolymer has far greater benzene solubility than the mixture.

This invention has been disclosed with respect to certain preferred embodiments, and various modifications and variations thereof will become obvious to persons skilled in the art. It is to be understood that such modifications and variations are to be included within the spirit and scope of this invention.

We claim:

1. An emulsion polymerization process consisting essentially in subjecting to polymerization conditions, at a temperature ranging from about 70° C. up to the boiling point, an emulsion of a water insoluble monomer selected from the group consisting of the esters of acrylic, methacrylic, α-ethacrylic, and α-chloroacrylic acids with monohydric alcohols, in an aqueous solution containing an N-vinyl lactam homopolymer and about 0.05 to 3%, based on the weight of said monomer, of a water soluble inorganic peroxygen catalyst, the weight ratio of said homopolymer to said monomer ranging from about 5:95 to 60:40, thereby producing directly a stable aqueous emulsion of a graft copolymer of said monomer on an N-vinyl lactam homopolymer substrate.

2. A process as defined in claim 1 wherein said monomer is methyl methacrylate.

3. A process as defined in claim 1 wherein said monomer is ethyl acrylate.

4. A process as defined in claim 1 wherein said polymeric N-vinyl lactam is polymeric N-vinyl-2-pyrrolidone.

5. A process as defined in claim 1 wherein said catalyst comprises ammonium persulfate.

References Cited by the Examiner

UNITED STATES PATENTS

| | | | |
|---|---|---|---|
| 2,890,199 | 6/1959 | McNulty et al. | 260—29.6 |
| 2,922,768 | 1/1960 | Mino et al. | 260—881 |
| 2,949,435 | 8/1960 | Davis et al. | 260—882 |
| 3,072,600 | 1/1963 | Murdock et al. | 260—876 |

FOREIGN PATENTS

| | | |
|---|---|---|
| 1,200,760 | 7/1959 | France. |
| 819,049 | 8/1959 | Great Britain. |

SAMUEL H. BLECH, *Primary Examiner.*

DANNEY ARNOLD, LEON J. BERCOVITZ, JAMES A. SEIDLECK, MURRAY TILLMAN, *Examiners.*

UNITED STATES PATENT OFFICE
CERTIFICATE OF CORRECTION

Patent No. 3,244,658            April 5, 1966

Frederick Grosser et al.

It is hereby certified that error appears in the above numbered patent requiring correction and that the said Letters Patent should read as corrected below.

Column 1, line 43, for "or" read -- of --; column 2, line 56, for "the" read -- these --; column 4, line 3, for "2,226,141" read -- 2,266,141 --; line 13, for "O.E." read -- E.O. --; line 17, for "sudfate" read -- sulfate --; line 39, for "fre flowing grapft polymer" read -- free flowing graft copolymer --; line 44, for "imitative" read -- limitative --; column 6, in the two tables of EXAMPLE 5, fourth column thereof, after each figure insert -- g --.

Signed and sealed this 21st day of January 1969.

(SEAL)
Attest:

Edward M. Fletcher, Jr.

Attesting Officer

EDWARD J. BRENNER

Commissioner of Patents